(12) United States Patent
Oshita et al.

(10) Patent No.: US 9,061,600 B2
(45) Date of Patent: Jun. 23, 2015

(54) AUXILIARY MACHINE MOUNTING STRUCTURE OF SADDLE-RIDE TYPE VEHICLE

(71) Applicant: HONDA MOTOR CO., LTD., Tokyo (JP)

(72) Inventors: Akira Oshita, Wako (JP); Hirotoshi Akita, Wako (JP); Tetsuo Kojima, Wako (JP); Nobuaki Kinoshita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/904,762

(22) Filed: May 29, 2013

(65) Prior Publication Data

US 2013/0320691 A1    Dec. 5, 2013

(30) Foreign Application Priority Data

May 31, 2012    (JP) ................. 2012-124359

(51) Int. Cl.
| | |
|---|---|
| *B60N 3/00* | (2006.01) |
| *B62J 17/04* | (2006.01) |
| *B62J 1/00* | (2006.01) |
| *B62J 11/00* | (2006.01) |
| *B62K 11/00* | (2006.01) |
| *B62J 99/00* | (2009.01) |

(52) U.S. Cl.
CPC .. *B60N 3/00* (2013.01); *B62J 17/04* (2013.01); *B62J 2099/0033* (2013.01); *B62J 2099/0026* (2013.01); *B62J 1/00* (2013.01); *B62J 11/00* (2013.01); *B62J 99/00* (2013.01); *B62K 11/00* (2013.01)

(58) Field of Classification Search
CPC ................................ B60R 11/00; B60R 11/02
USPC ................. 296/37.12, 78.1; 180/90; 248/27.1
See application file for complete search history.

(56) References Cited

U.S. PATENT DOCUMENTS 8,454,073 B2 *   6/2013   Grandel et al. ............ 296/37.12

FOREIGN PATENT DOCUMENTS

| JP | 2002269611 A | * | 9/2002 |
|---|---|---|---|
| JP | 2008-80868 A | | 4/2008 |

* cited by examiner

*Primary Examiner* — Jason S Morrow
(74) *Attorney, Agent, or Firm* — Birch, Stewart, Kolasch & Birch, LLP

(57) ABSTRACT

An auxiliary machine mounting structure of a saddle-ride type vehicle that ensures consistent appearance irrespective of the presence or absence of a mounting of an auxiliary machine or device such as an antenna being mounted on a meter visor to ensure the degree of freedom in layout without having to consider the possibility of the windshield creating a ghost image of the auxiliary machine or device. An opening is formed on the windshield side of the meter visor. An ETC cover is detachably mounted on the meter visor to cover the opening. An antenna is positioned beneath the ETC cover and disposed in the opening.

17 Claims, 17 Drawing Sheets

AUXILIARY MACHINE MOUNTING STRUCTURE OF SADDLE-RIDE TYPE VEHICLE

CROSS-REFERENCE TO RELATED APPLICATIONS

The present application claims priority under 35 USC 119 to Japanese Patent Application No. 2012-124359 filed May 31, 2012 the entire contents of which are hereby incorporated by reference.

BACKGROUND OF THE INVENTION

1. Field of the Invention

The present invention relates to an auxiliary machine mounting structure of a saddle-ride type vehicle configured so that an auxiliary machine is attached to a meter visor disposed in the lower rear of a windshield.

2. Description of Background Art

A motorcycle is known that includes an auxiliary machine mounting structure configured such that a meter visor is disposed in the lower rear of a windshield. A recessed portion is formed in the meter visor with an antenna for an ETC system (Electronic Toll Collection system), that is used as an auxiliary machine, being disposed in the recessed portion. See, for example, JP-A No. 2008-80868.

The technology described in JP-A No. 2008-80868 employs a structure wherein the antenna is disposed in the recessed portion of the meter visor. Therefore, if no antenna is disposed in the recessed portion, the recessed portion is exposed to view through the windshield. Further, the position of the antenna is limited to prevent the inner surface of the windshield from creating a ghost image of the antenna.

SUMMARY AND OBJECTS OF THE INVENTION

The present invention has been made in view of the above circumstances. An object of an embodiment of the present invention is to provide an auxiliary machine mounting structure of a saddle-ride type vehicle that ensures a consistent appearance irrespective of the presence or absence of mounting when the auxiliary machine such as an antenna is mounted on a meter visor and ensures the degree of freedom in layout without having to consider the possibility of the windshield creating a ghost image of the auxiliary machine.

In order to address the above problem, according to an embodiment of the present invention, an auxiliary machine mounting structure of a saddle-ride type vehicle includes a windshield (61), a meter visor (204), a seat (10), and auxiliary machines (242, 243). The windshield (61) is disposed at the front of a vehicle body and made of a transparent member. The meter visor (204) is disposed in the lower rear of the windshield (61). The seat (10) on which an occupant is seated is disposed in the rear of the meter visor (204). The auxiliary machines (242, 243) are disposed on the windshield (61) side of the meter visor (204). Openings (244a, 256a) are formed in the windshield (61) side of the meter visor (204). Lids (251, 258h) are detachably mounted on the meter visor (204) to cover the openings (244a, 256a). The auxiliary machines (242, 243) are positioned beneath the lids (251, 258h) and disposed in the openings (244a, 256a).

According to an embodiment of the present invention, the lids are detachably mounted on the meter visor. This makes it possible not only to lay the lids over the openings without regard to the presence of the auxiliary machines to prevent the auxiliary machines from being exposed toward the windshield, but also to inhibit the windshield from creating a ghost image of the auxiliary machines.

According to an embodiment of the present invention, the auxiliary machine (243) may include a display section (243a) to indicate the status of the auxiliary machine (243) to the occupant and cover the top of the display section (243a) with the lids (251, 258h). As this configuration covers the top of the display section with the lids, it is possible to reduce the influence of external illuminance and enhance the visibility of the display section.

In the above-described configuration, an inner wall portion (246) integral with the meter visor (204) may be formed in the opening (244a) with the auxiliary machines (242, 243) fastened to the inner wall portion (246). This configuration fastens the auxiliary machines to the meter visor side, thereby eliminating the necessity of increasing the support strength of the lids.

According to an embodiment of the present invention, sidewalls (251c, 251d) may be formed on the right and left ends of the lid (251). Further, a plurality of lock portions (251k, 251m) may be disposed on the sidewalls (251c, 251d), a lock target portion (246s) may be disposed on the inner wall portion (246), and the lock portions (251k, 251m) and the lock target portion (246s) may selectively engage with each other in order to selectively change the mounting status of the lid (251). This configuration makes it possible to change the mounting status of the lid by using a simple structure.

According to an embodiment of the present invention, a plurality of auxiliary machines (242, 243) may be disposed in the opening (244a). Further, the auxiliary machines (242, 243), which are electric components to which electrical power and signals are transmitted through cables (253, 254), may be connected to connectors (261, 262) through the cables (253, 254). Furthermore, connector passage spaces (246j, 246m) for allowing the connectors (261, 262) to pass through the meter visor (204) may be respectively provided on a bottom wall (246e) and a sidewall (246a), that form the inner wall portion (246). As this configuration provides the bottom wall and sidewall with the connector passage spaces, the connector passage spaces can be enlarged wherever possible. In addition, as the connector passage spaces are provided, the bottom wall and sidewall can be lightened for weight reduction purposes.

According to an embodiment of the present invention, the lid (251) may be disposed in an open state so that its rear portion is open in relation to the opening (244a). Further, the front portion of the lid (251) may be provided with a journal point (251e) around which the lid (251) turns. According to this configuration, the lock portions and the journal point can position the lid in the open state by using a simple structure.

According to an embodiment of the present invention, the length of the auxiliary machine (243) may be oriented in the front-rear direction of the vehicle body with the display section (243a) disposed on the rear of the auxiliary machine (243). This configuration makes it possible to enhance the visibility of the display section.

According to an embodiment of the present invention, the openings are formed in the windshield side of the meter visor while the lids are detachably mounted on the meter visor to cover the openings. Further, the auxiliary machines are positioned beneath the lids and disposed in the openings. This makes it possible not only to lay the lids over the openings without regard to the presence of the auxiliary machines and prevent the auxiliary machines from being exposed toward the windshield, but also to inhibit the windshield from creating a ghost image of the auxiliary machines.

As an auxiliary machine includes the display section to indicate the status of the auxiliary machine to the occupant and covers the top of the display section with the lids, it is possible to reduce the influence of external illuminance and enhance the visibility of the display section.

As the inner wall portion integral with the meter visor is formed in an opening with the auxiliary machines fastened to the inner wall portion, the auxiliary machines are fastened to the meter visor side. This eliminates the necessity of increasing the support strength of the lids.

As the sidewalls are formed on the right and left ends of the lid, the lock portions are disposed on the sidewalls, the lock target portion is disposed on the inner wall portion, and the lock portions and the lock target portion selectively engage with each other, the mounting status of the lid is selectively changed. This makes it possible to change the mounting status of the lid by using a simple structure.

As the plurality of auxiliary machines, that are electric components to which electrical power and signals are transmitted through the cables, are disposed in the opening and connected to the connectors through the cables, and the connector passage spaces for allowing the connectors to pass through the meter visor are respectively provided on the bottom wall and sidewall, which form the inner wall portion, the connector passage spaces can be enlarged wherever possible. In addition, as the connector passage spaces are provided, the bottom wall and sidewall can be lightened for weight reduction purposes.

As the lid is placed in the open state so that its rear portion is open in relation to the opening, and the front portion of the lid is provided with the journal point around which the lid turns, the lock portions and the journal point can position the lid in the open state by using a simple structure.

As the length of the auxiliary machine is oriented in the front-rear direction of the vehicle body with the display section disposed on the rear of the auxiliary machine, it is possible to enhance the visibility of the display section.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6(A) is a plan view illustrating the ETC cover laid over the ETC auxiliary machines, and FIG. 6(B) is a plan view illustrating a state where the ETC cover shown in FIG. 6(A) is removed;

FIG. 17(A) is a cross-sectional view illustrating the ETC auxiliary machines housed in an ETC compartment body, and FIG. 17(B) is a cross-sectional view illustrating a state where the ETC auxiliary machines are not housed in the ETC compartment body.

DETAILED DESCRIPTION OF THE PREFERRED EMBODIMENTS

Figure 1:
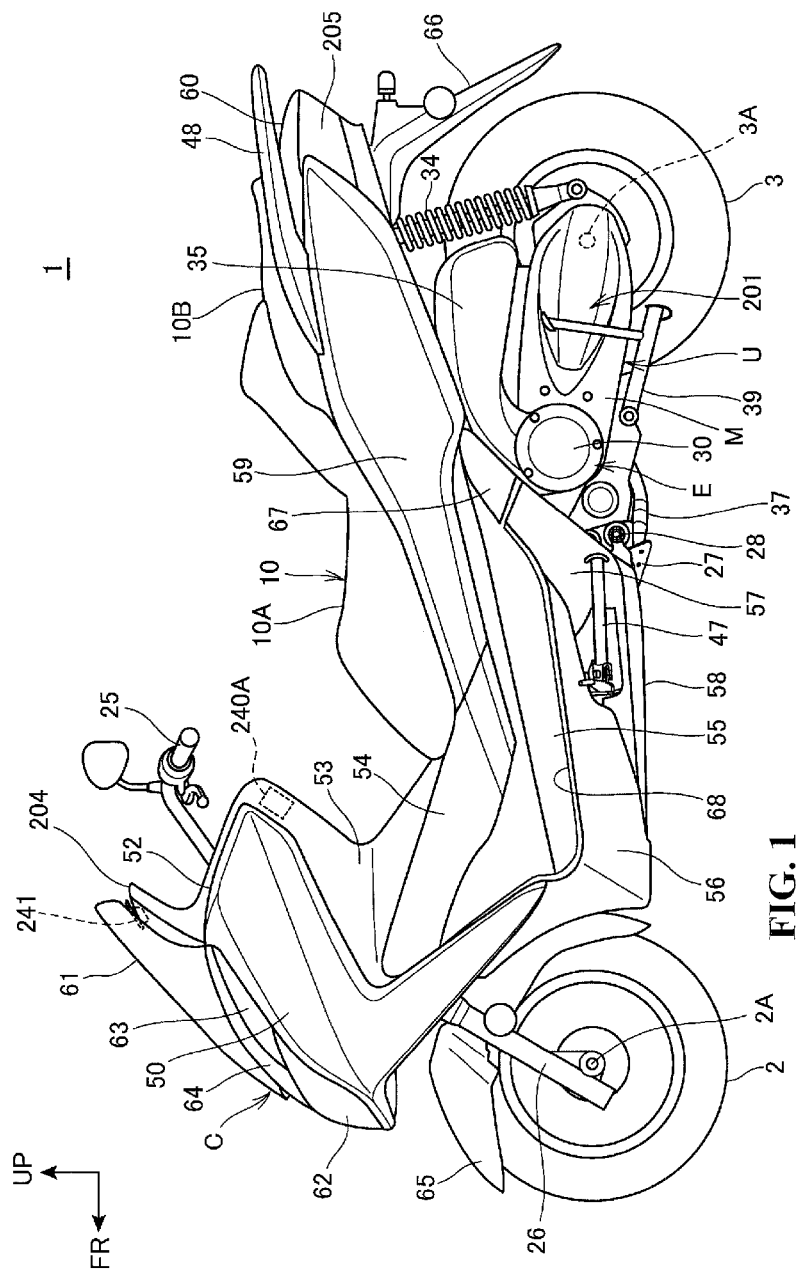
FIG. 1 is a left side view of a motorcycle to which a first embodiment of the present invention is applied.

An embodiment of the present invention will now be described with reference to the accompanying drawings. In the subsequent description, all references to direction such as up, down, front, rear, right, and left are the same as the direction relative to the body of a vehicle unless otherwise stated. In the drawings, reference sign FR denotes a forward direction as viewed from the vehicle body, reference sign UP denotes an upward direction as viewed from the vehicle body, and reference sign LE denotes a leftward direction as viewed from the vehicle body.

FIG. 1 is a left side view of a motorcycle 1 to which a first embodiment of the present invention is applied.

The motorcycle 1 (saddle-ride type vehicle) is a scooter-type vehicle having a low-slung step floor 68 on which an occupant seated on a seat 10 of the motorcycle 1 is to place his/her feet. The motorcycle 1 has a front wheel 2, that is positioned in the front of a body frame (not shown), and a rear wheel 3, that is a driving wheel that is journaled to a unit swing engine U (unit swing power unit) disposed in the rear of the vehicle. The body frame is covered with a resin body cover Cf.

A steering system for steering the front wheel 2 includes a steering shaft and a handlebar 25. The steering shaft is turnably journaled to a head pipe that forms the front end of the body frame. The handlebar 25 is coupled to the top of the steering shaft. The lower end of the steering shaft is coupled to a pair of right and left front forks 26, 26 (only the reference sign 26 on the near side is shown). The front wheel 2 is journaled to an axle 2A disposed on the lower ends of the front forks 26, 26 and steered by manipulating the handlebar 25.

The unit swing engine U is a unit swing type wherein an engine E is integral with a transmission case M. A belt-type continuously-variable transmission mechanism 201 is housed in the transmission case M. The unit swing engine U doubles as a swing arm for supporting the rear wheel 3. The unit swing engine U is coupled to the body frame through a link member 27. The link member 27 is coupled to the front of the unit swing engine U. The unit swing engine U is vertically swingable around a pivot shaft 28 disposed on the link member 27.

The engine E is a water-cooled four-cycle single-cylinder engine and disposed so that a cylinder axis extends forward in a substantially horizontal direction. The engine E is formed by combining a cylinder with a cylinder head and positioned in front of a crankcase 30, which is disposed on the front of the unit swing engine U. An exhaust pipe 37 is connected to an exhaust port on the underside of the cylinder head. The exhaust pipe 37 is routed beneath the engine E, extends rearwardly, and is connected to a muffler that is secured to an outer lateral surface of an arm section described later.

The transmission case M is routed from the rear of the crankcase 30 through the left side of the rear wheel 3 and extends rearwardly. The rear of the crankcase 30 is provided with the arm section that extends rearwardly through the right side of the rear wheel 3. The rear wheel 3 is supported by an axle 3A that is disposed between the rear of the transmission case M and the rear of the arm section. The output of the engine E is transmitted to the rear wheel 3 through the continuously-variable transmission mechanism 201. A rear suspension 34 is stretched between the rear end of the transmission case M and the upper rear of the body frame and between the rear end of the arm section and the upper rear of the body frame. An air cleaner box 35 sucking outside air is disposed on the upper surface of the transmission case M.

The air cleaner box 35 is connected to a throttle body through a connecting tube that is not illustrated. The throttle body is connected to an intake port positioned on the upper surface of the cylinder head.

A main stand 39 is disposed on the lower rear of the transmission case M. The main stand 39 is used to support the vehicle in an upright position. A side stand 47 is provided.

The seat 10, which openably and closably covers an opening that extends over the entire length of the upper surface of a storage box that is disposed beneath the seat 10. The seat 10 includes a front seat 10A and a rear seat 10B. The rear seat 10B is formed one level higher than the front seat 10A. A rider sits on the front seat 10A. A pillion passenger sits on the rear seat 10B.

A grab rail 48 is fastened to the rear of a pair of right and left seat rails, that are disposed behind the storage box to form the body frame.

The body cover C includes a front cover 50, a front lower cover (not shown), an upper cover 52, an upper inner cover 53, a pair of right and left lower inner covers 54, 54 (only the reference sign 54 on the near side is shown), a pair of right and left step covers 55, 55 (only the reference sign 55 on the near side is shown), a pair of right and left front floor skirts 56, 56 (only the reference sign 56 on the near side is shown), a pair of right and left rear floor skirts 57, 57 (only the reference sign 57 on the near side is shown), an undercover 58, a pair of right and left body side covers 59, 59 (only the reference sign 59 on the near side is shown), and a tail cover 60. The front cover 50 covers the front and right and left sides of the head pipe. The front lower cover is coupled to the lower part of the front cover 50 and positioned behind the front wheel 2. The upper cover 52 is positioned below the handlebar 25 and coupled to the top of the front cover 50. The upper inner cover 53 is coupled to the right and left edges of the front cover 50. The lower inner covers 54, 54 are coupled to the lower edge of the upper inner cover 53. The step covers 55, 55 are coupled to the lower part of the front cover 50 and to the lower edges of the lower inner covers 54, 54. The front floor skirts 56, 56 are coupled to the lower part of the front cover 50 and to the lower parts of the step covers 55, 55. The rear floor skirts 57, 57 are contiguous to the front floor skirts 56, 56 and extend rearwardly. The undercover 58 covers the lower part of the vehicle body. The body side covers 59, 59 are coupled to the rear of the lower inner covers 54, 54 and step covers 55, 55. The tail cover 60 is coupled to the rear of the body side covers 59, 59.

The step floor 68 on which the rider seated on the front seat 10A places his/her feet is formed on the bottom of each step cover 55, 55.

The front of the front cover 50 is provided with a windshield 61 that extends in an upward and rearward direction to protect the rider from the wind. The front end of the front cover 50 is provided with a pair of right and left headlights 62, 62 (only the reference sign 62 on the near side is shown). A pair of right and left blinkers 63, 63 (only the reference sign 63 on the near side is shown) is disposed contiguously to the upper parts of the headlights 62, 62. A plate-like garnish 64 (that forms a part of the front cover 50) is disposed between the headlights 62, 62 and the windshield 61.

The front forks 26, 26 are provided with a front fender 65 that is laid over the front wheel 2. A rear fender 66 is positioned below the body side covers 59, 59 and laid over the rear wheel 3.

A pair of right and left collapsible tandem steps 67, 67 (only the reference sign 67 on the near side is shown) on which the pillion passenger on the rear seat 10B places his/her feet is supported by the body frame through a stay.

A meter visor 204 (a part forming the front cover 50) is disposed behind the windshield 61. The meter visor 204 is laid over meters, which are disposed in front of the handlebar 25, in order to enhance the visibility of the meters. A rear combination lamp 205 is provided.

The motorcycle 1 has an ETC system 240 that is mounted on the front of the vehicle body. The ETC system 240 includes a vehicle-mounted main body 240A and an ETC auxiliary machine 241. The vehicle-mounted main body 240A is disposed inside the body cover C. The ETC auxiliary machine 241 includes an antenna and an indicator, that are connected to the vehicle-mounted main body 240A and disposed on the upper rear of the meter visor 204.

Figure 2:
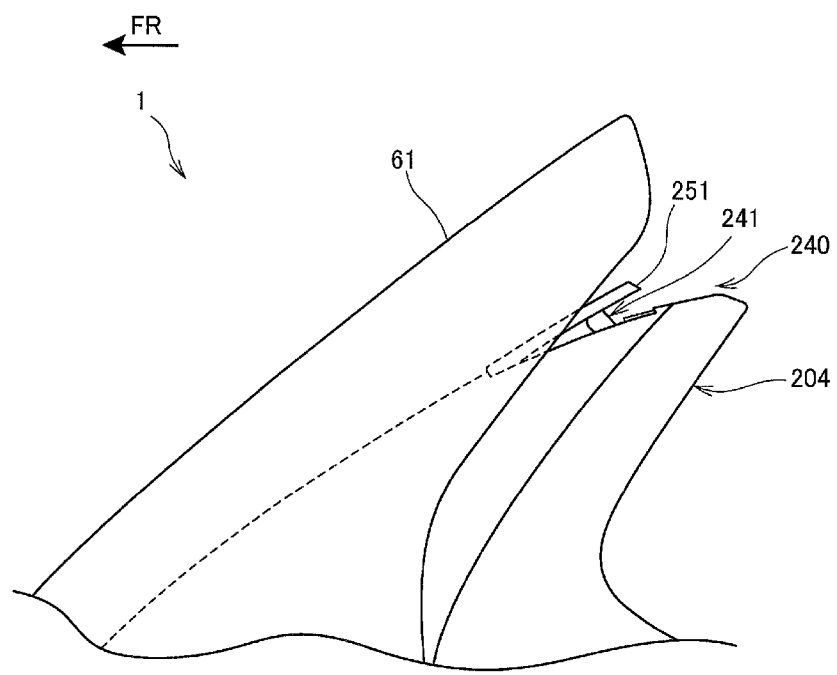
FIG. 2 is a side view of essential parts of the upper front of the motorcycle.

FIG. 2 is a side view of essential parts of the upper front of the motorcycle 1.

The motorcycle 1 is configured so that the ETC auxiliary machine 241 and an ETC cover 251 are disposed on the upper rear of the resin meter visor 204. The ETC auxiliary machine 241 includes the antenna and indicator, that partially form the ETC system 240. The ETC cover 251 is laid over the ETC auxiliary machine 241. The ETC system 240, that is a device that automatically pays fees for a toll road by means of wireless communication, includes the vehicle-mounted main body 240A (see FIG. 1) and the ETC auxiliary machine 241, that is cable-connected to the vehicle-mounted main body 240A.

Figure 3:
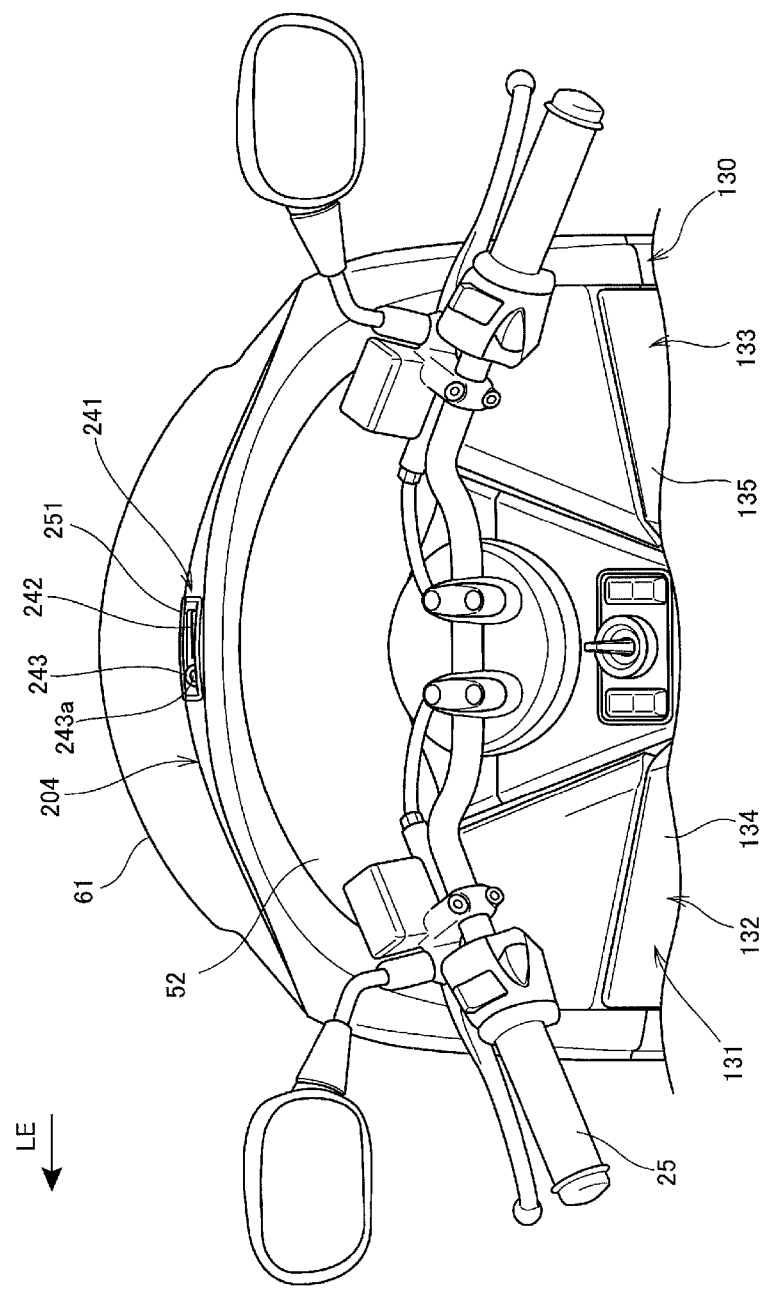
FIG. 3 is a perspective view of the front of a vehicle body.

FIG. 3 is a perspective view of the front of the vehicle body. It is a view of an area around the handlebar 25 as taken from a seated rider.

The antenna 242 and the indicator 243, that form the ETC auxiliary machine 241, are positioned below the windshield 61 and disposed on the upper part of the meter visor 204. The ETC cover 251 is laid over the antenna 242 and the indicator 243.

The antenna 242 is connected to communication means included in the vehicle-mounted main body to wirelessly communicate with an antenna installed at a tollbooth of the toll road. The indicator 243 includes a display section 243a that notifies the rider of the status of the ETC system 240. When, for instance, the display section 243a glows green, the ETC system 240 is available. When, for instance, the display section 243a glows red, the ETC system 240 is unavailable (in an error state).

The ETC cover 251 is laid over the ETC auxiliary machine 241. In the daytime, therefore, the visibility of the display section 243a of the indicator 243 does not decrease due to the external brightness (illuminance). Further, in the nighttime, the inner surface of the meter visor 204 does not create a ghost image of an illuminated display section 243a.

A front cover 130 is positioned near the head pipe to cover the front of the vehicle. A front storage box 131 is disposed inside the front cover 130. Right and left commodity storage sections 132 and 133 form the front storage box 131. A left lid and a right lid 134 and 135, respectively, cover the openings of the commodity storage sections 132, 133.

Figure 4:
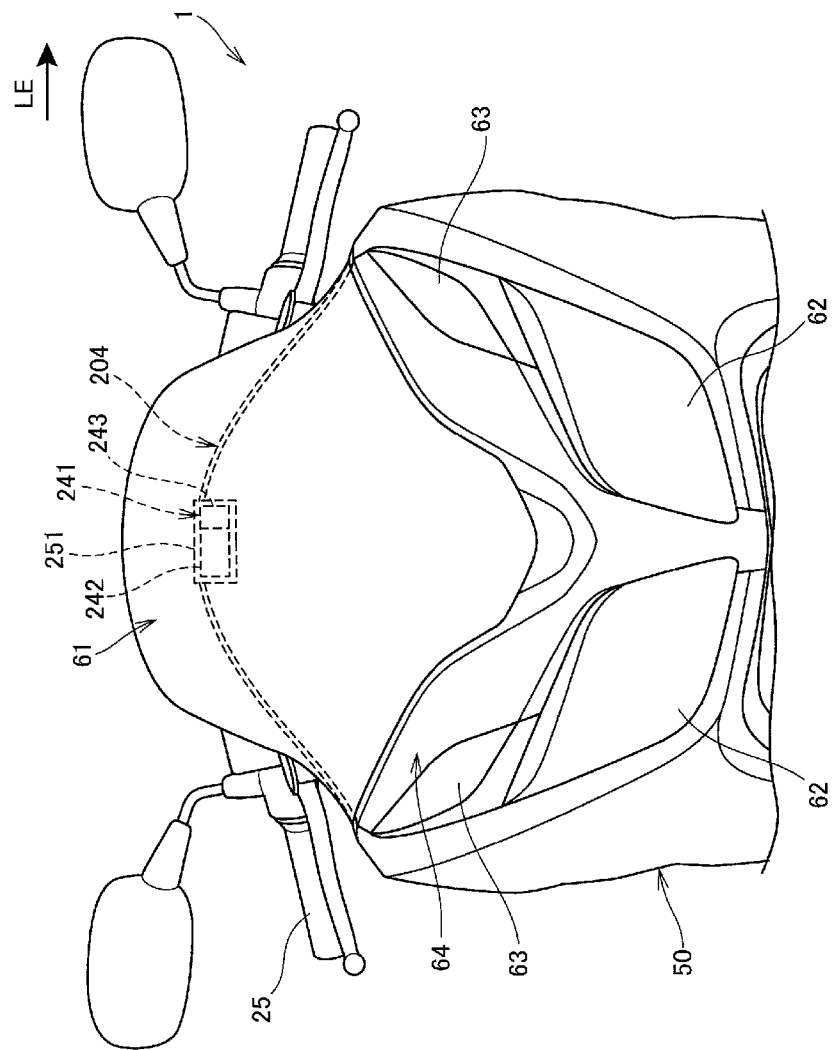
FIG. 4 is a top front view of the motorcycle that shows how an ETC cover is disposed.

FIG. 4 is a top front view of the motorcycle 1 that shows how the ETC cover 251 is disposed.

The ETC auxiliary machine 241 and the ETC cover 251 are disposed at the upper center of the meter visor 204 with respect to the direction of the vehicle width, that is, mounted on a high portion of the meter visor 204, in order to enhance the sensitivity of the antenna 242. Further, as the ETC cover 251 is laid over the ETC auxiliary machine 241, the ETC auxiliary machine 241 is hidden from a top view and from a front view. This provides an improved appearance.

Figure 5:
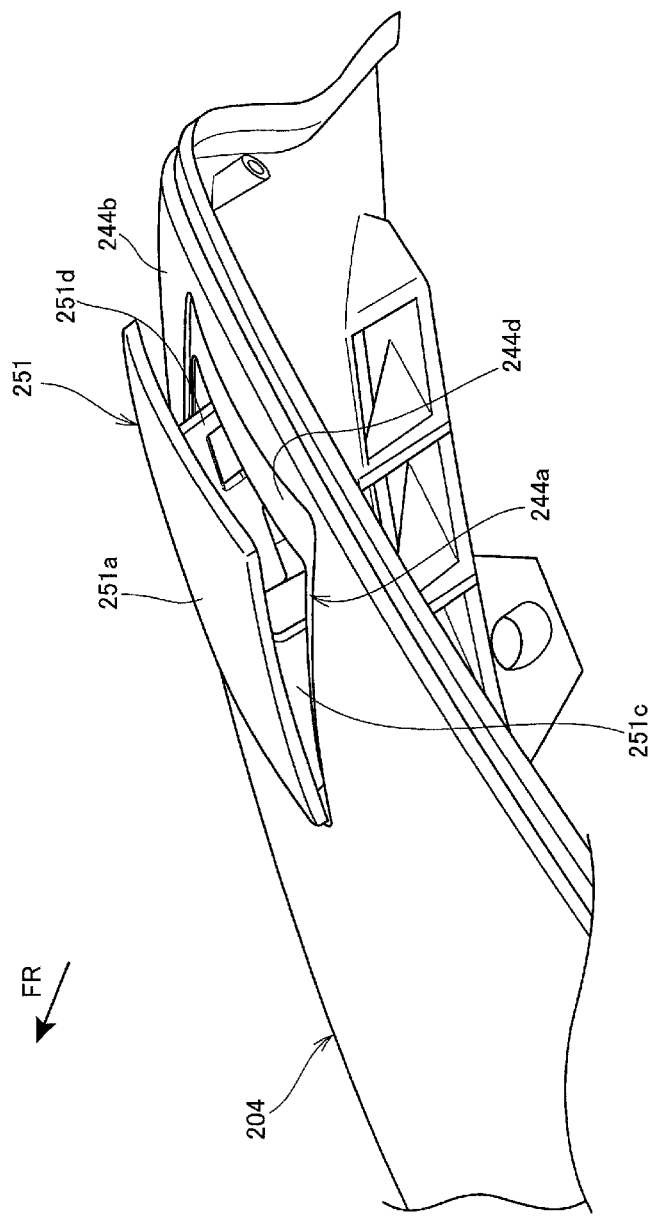
FIG. 5 is a perspective view illustrating how the ETC cover is mounted.

FIG. 5 is a perspective view illustrating how the ETC cover 251 is mounted.

An opening 244a is formed in the upper rear of the meter visor 204. The ETC cover 251 is laid over the opening 244a.

The ETC cover 251 is a single-piece article that includes an upper wall 251a and a pair of right and left sidewalls 251c, 251d. The upper wall 251a is sloped in an upward, rearward direction with respect to the upper surface 244b of the meter visor 204. The sidewalls 251c, 251d integrally extend downwardly from the bottom surface of the upper wall 251a and detachably engaged with the inside of the meter visor 204. It is preferred that the ETC cover 251 be made, for instance, of resin.

Referring to FIG. 5, the ETC auxiliary machine 241 is disposed under the ETC cover 251, and the upper wall 251a of the ETC cover 251 is sloped in an upward, rearward direction to leave the rear portion of the opening 244a uncovered (the ETC cover 251 is open). However, if the ETC auxiliary machine 241 is not disposed in its position, the sidewalls 251c, 251d can engage with the inside of the meter visor 204 so that the upper wall 251a is attached to the upper surface 244b of the meter visor 204 (more specifically, attached to a stepped portion 244d formed on the upper surface 244b) to cover the opening 244a (close the ETC cover 251). This provides an improved appearance because the opening 244a is covered by the ETC cover 251 and not exposed to the outside.

Figure 6A:
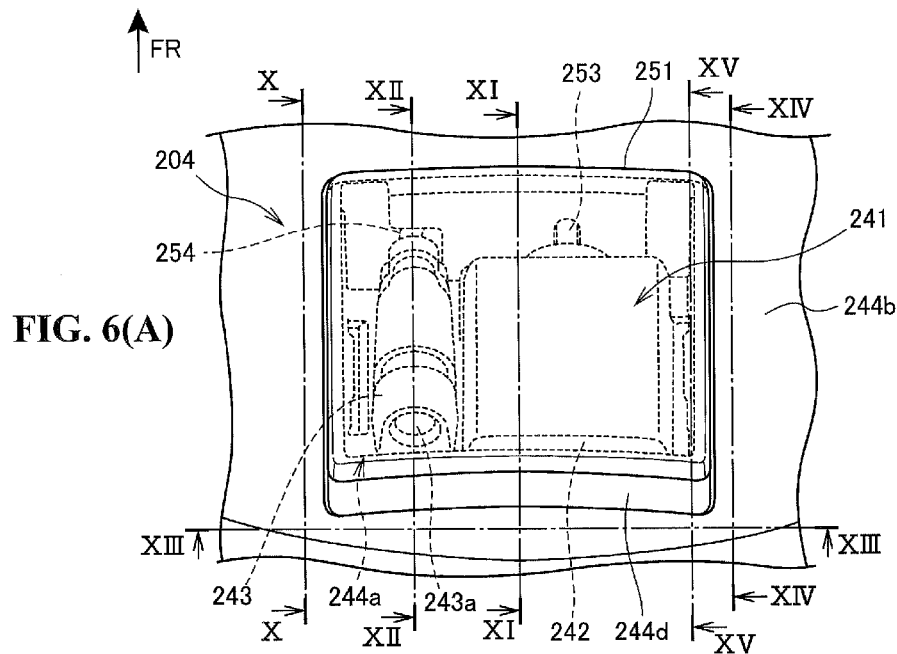
FIGS. 6(A) and 6(B) are plan views illustrating how ETC auxiliary machines are mounted.
Figure 6B:
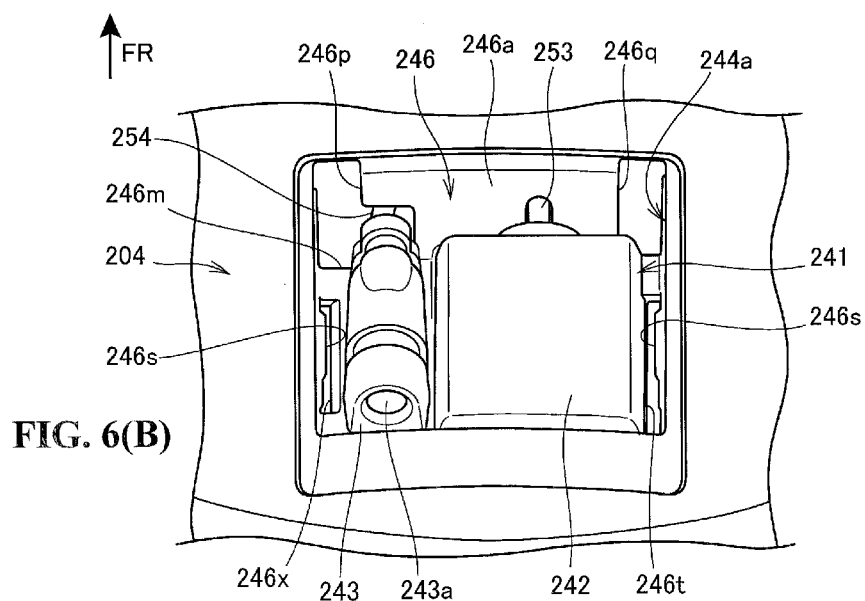

FIGS. 6(A) and 6(B) are plan views illustrating how the ETC auxiliary machine 241 is mounted, FIG. 6(A) is a plan view illustrating the ETC cover 251 laid over the ETC auxiliary machine 241, and FIG. 6(B) is a plan view illustrating a state where the ETC cover 251 shown in FIG. 6(A) is removed.

As shown in FIG. 6(A), the opening 244a of the meter visor 204 is completely covered by the ETC cover 251 when viewed from above. The stepped portion 244d is formed one step lower on the upper surface 244b of the meter visor 204 disposed around the opening 244a. The stepped portion 244d is shaped and sized so that it can be disposed in its position when the ETC cover 251 is closed.

As shown in FIG. 6(B), the antenna 242 and the indicator 243 are lined up in the direction of the vehicle width within an ETC compartment 246 that is formed in the opening 244a and integral with the meter visor 204. The antenna 242 is rectangular in shape when viewed from above. A signal transmission cable 253 extends forward from the front end of the antenna 242. The indicator 243 is an elongated part whose length extends in the direction of the vehicle length within the opening 244a. The display section 243a is disposed in the rear of the indicator 243 so that it is easily visible to the rider. A power supply cable 254 extend forward from the front end of the indicator 243. A connector (not shown) for connecting to the vehicle-mounted main body is attached to each end of the cables 253, 254.

Figure 7:
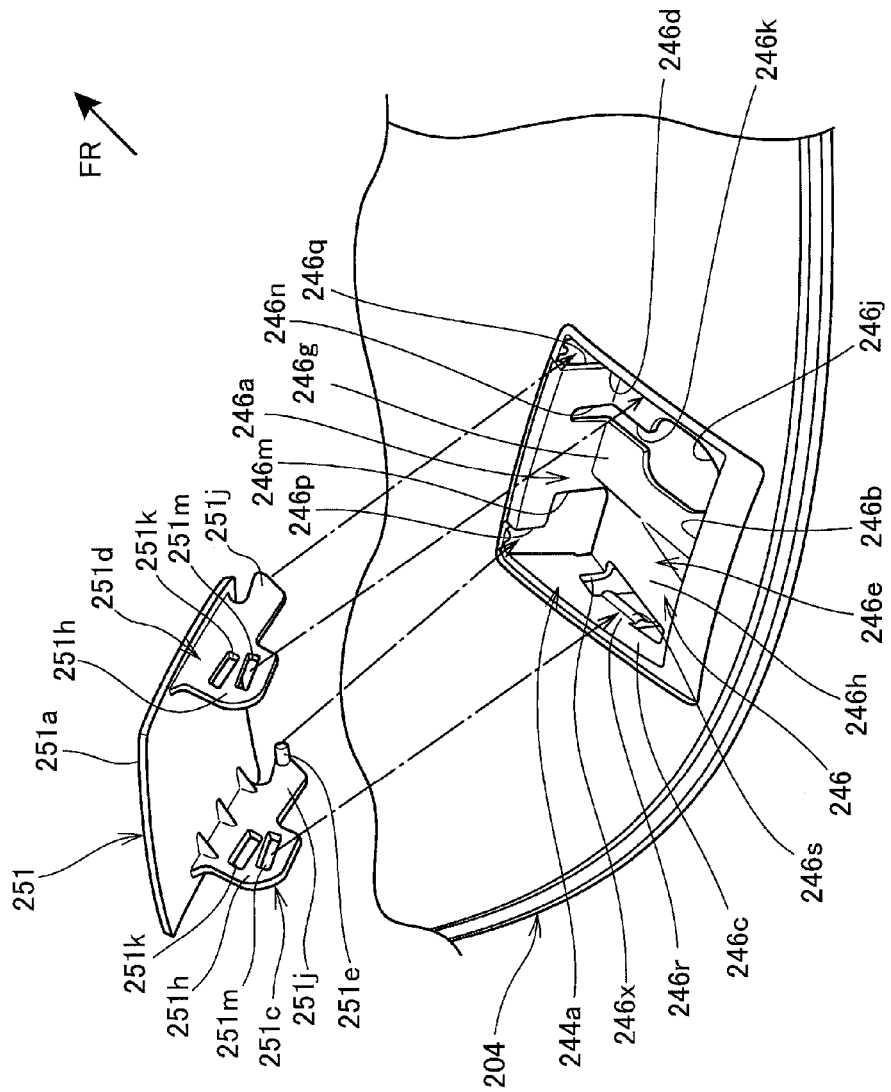
FIG. 7 is a perspective view illustrating an ETC compartment and the ETC cover.

FIG. 7 is a perspective view illustrating the ETC compartment 246 and the ETC cover 251.

The ETC compartment 246 includes four walls extending downwardly from the edge of the opening 244a, namely, a front wall 246a, a rear wall 246b, a left wall 246c, and a right wall 246d, as well as a bottom wall 246e, that joins the lower edges of the front wall 246a, rear wall 246b, left wall 246c, and right wall 246d.

A planar antenna mount 246g on which the antenna 242 is mounted and a planar indicator mount 246h on which the indicator 243 is mounted are adjacently disposed on the bottom wall 246e. The antenna mount 246g has a connector insertion hole 246j and a cable insertion hole 246k. The connector insertion hole 246j is used to route a connector from the opening 244a to a location below the ETC compartment 246. The cable insertion hole 246k is formed from the bottom wall 246e to the front wall 246a to communicate with the connector insertion hole 246j so that the cable 253 can be moved toward the front wall 246a after the connector is inserted into the connector insertion hole 246j. The indicator mount 246h is sloped so that its rear end is higher than the antenna mount 246g. Due to such a slope, the display section 243a of the indicator 243 is oriented so that it is easily visible to the rider.

The front wall 246a has a connector insertion hole 246m, a front insertion hole 246n, and a pair of right and left cover insertion holes 246p, 246q. The connector insertion hole 246m accepts a connector for the indicator 243. The front insertion hole 246n forms a part of the aforementioned cable insertion hole 246k. The cover insertion holes 246p, 246q accept the front ends of the sidewalls 251c, 251d of the ETC cover 251. The connector insertion hole 246m also accepts the cable 254 in addition to the connector. The lower part of the connector insertion hole 246m is formed to the front end of the indicator mount 246h. The left cover insertion hole 246p is in communication with the connector insertion hole 246m.

The left wall 246c includes a left projection wall 246r, that projects downwardly. A projection 246s, which projects to the right, is formed on the inner surface of the left projection wall 246r.

The ETC cover 251 is an integrally molded part having the upper wall 251a and the pair of right and left sidewalls 251c, 251d extending downwardly from the upper wall 251a. The sidewalls 251c, 251d are substantially left-right symmetric and have the same configuration. Therefore, only the sidewall 251c is described below.

The sidewall 251c includes a rear bulge 251h and a front extension 251j. The rear bulge 251h bulges downwardly from the upper wall 251a. The front extension 251j extends forward from the rear bulge 251h and is partly connected to the upper wall 251a.

The rear bulge 251h has an upper rectangular hole 251k and a lower rectangular hole 251m, that are rectangular in shape and arranged/opened in a vertical direction. The leading end of the front extension 251*j* has a cylindrical fulcrum 251*e* that projects inwardly in the direction of the vehicle width.

Figure 8:
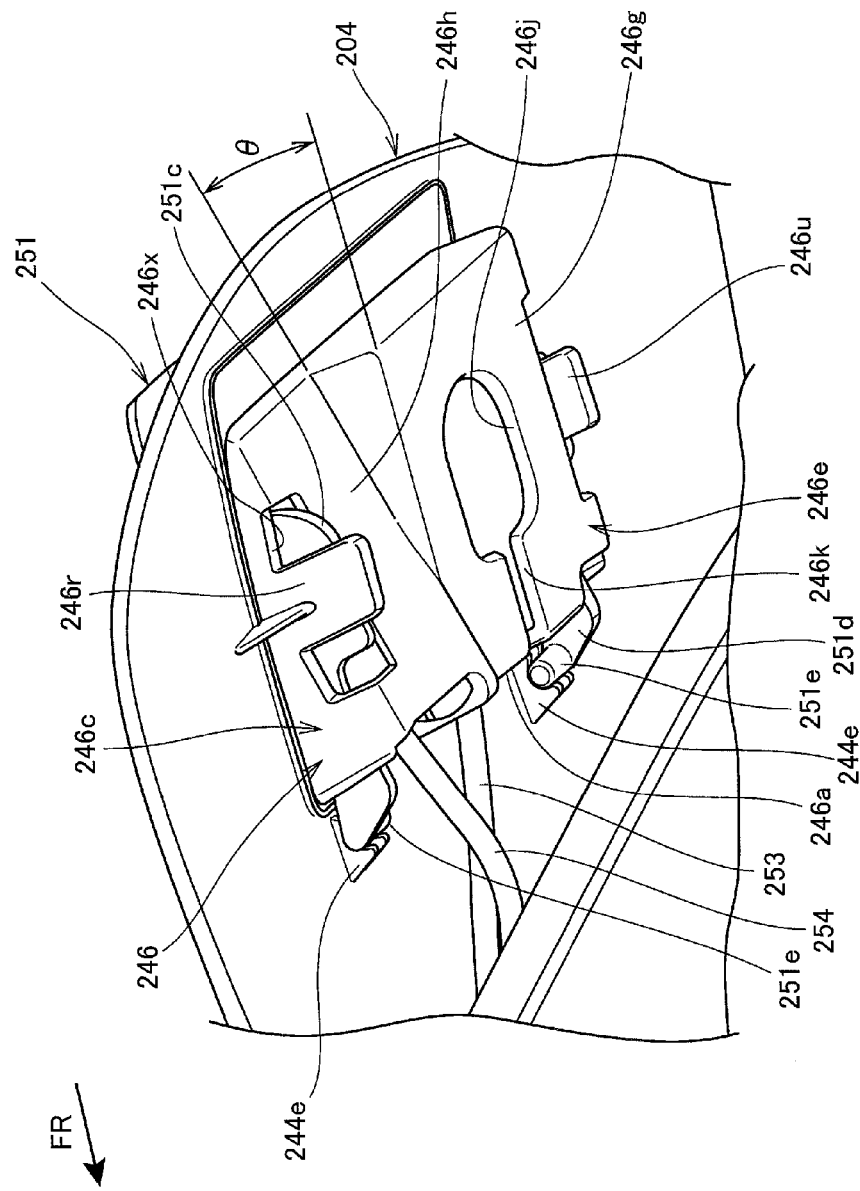
FIG. 8 is a perspective view of the ETC compartment as taken from the rear side of a meter visor.
Figure 9:
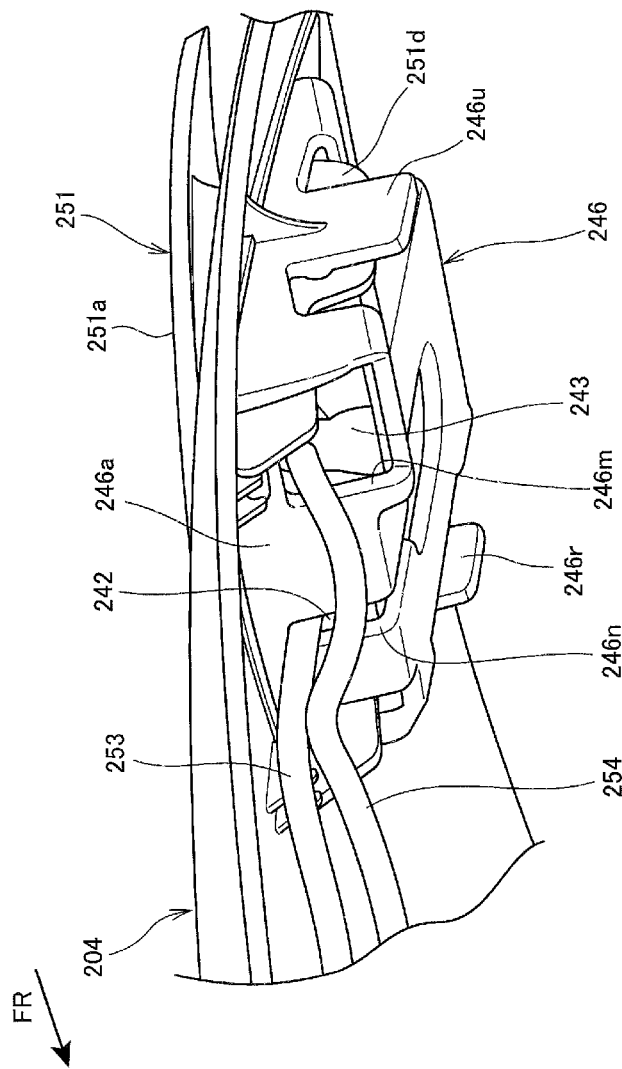
FIG. 9 is a perspective view of the ETC compartment as taken from a front obliquely lateral side.

FIG. 8 is a perspective view of the ETC compartment 246 as taken from the rear side of the meter visor 204. FIG. 9 is a perspective view of the ETC compartment 246 as taken from a front obliquely lateral side.

As shown in FIG. 8, the left wall 246*c* has a lateral opening 246*x* and a left projection wall 246*r*. The lateral opening 246*x* is open laterally. The left projection wall 246*r* projects downwardly from the upper edge of the lateral opening 246*x*. The lateral opening 246*x* is also partly formed in the left end of the bottom wall 246*e*. The left sidewall 251*c* of the ETC cover 251 projects downwardly from the lateral opening 246*x*. Further, as indicated in FIG. 8, the front ends of the sidewalls 251*c*, 251*d* of the ETC cover 251 project to the front from the front wall 246*a*. As is the case with the left wall 246*c*, the right wall 246*d* (see FIG. 7) has a lateral opening 246*t* (see FIG. 6(B)) and a right projection wall 246*u*.

The bottom wall 246*e* has the antenna mount 246*g* and the indicator mount 246*h*, that form an angle of θ. The indicator mount 246*h* is more steeply sloped than the antenna mount 246*g* and extends in an upward, rearward direction.

As shown in FIG. 9, the cable 253 is routed to the front from the front end of the antenna 242 through the front insertion hole 246*n* in the front wall 246*a* of the ETC compartment 246. The cable 254 is routed to the front from the front end of the indicator 243 through the connector insertion hole 246*m* in the front wall 246*a*.

Figure 10:
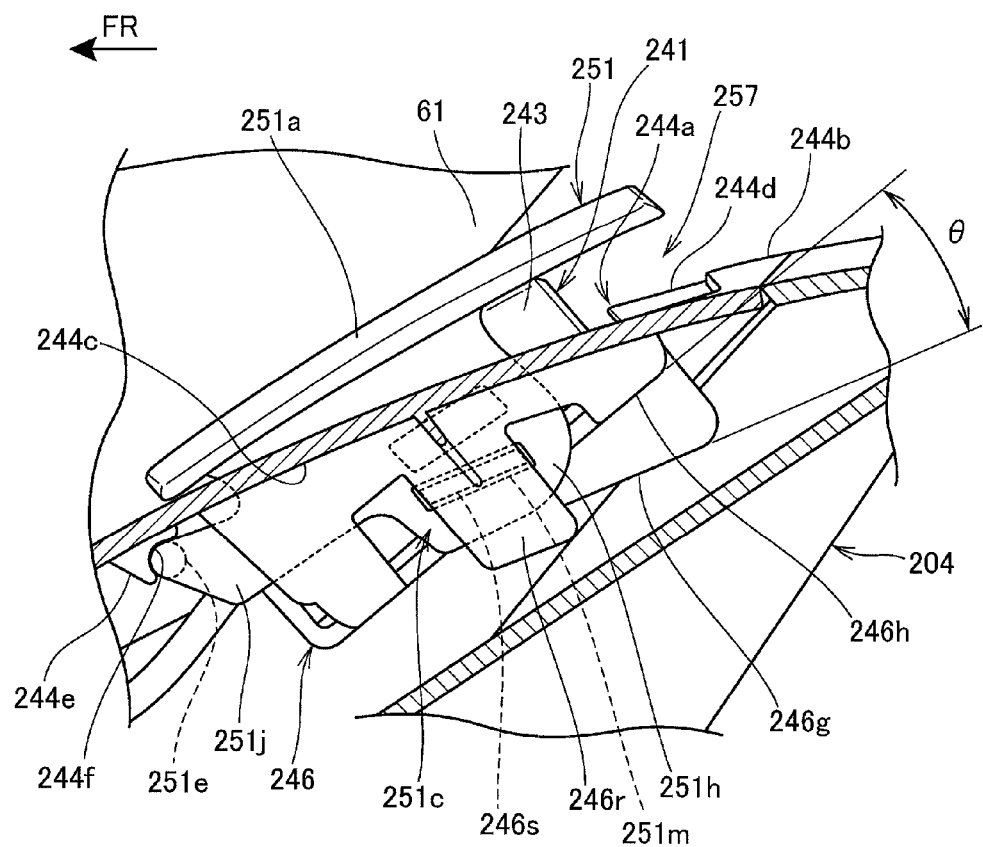
FIG. 10 is a cross-sectional view taken along line X-X of FIG. 6(A)

FIG. 10 is a cross-sectional view taken along line X-X of FIG. 6(A).

A gap 257 is formed between the upper surface 244*b* of the meter visor 204 and the rear end of the ETC cover 251. The indicator mount 246*h* of the ETC compartment 246 is sloped at an inclination angle that is larger than that of the antenna mount 246*g* by the angle θ. The indicator 243 is disposed at a slope along the indicator mount 246*h*. As a result, the rear end (display section) of the indicator 243 is easily visible to the rider.

At a rear surface 244*c* and in the vicinity of the front edge of the opening 244*a*, the meter visor 204 is formed integrally with a pair of right and left fulcrum supports 244*e*, 244*e* (only the reference sign 244*e* on the near side is shown) that project downwardly. The front end of the sidewall 251*c* of the ETC cover 251, or more specifically, the cylindrical fulcrum 251*e* that project inwardly in the direction of the vehicle width from the leading end of the sidewall 251*c*, is turnably applied to and supported by the left fulcrum support 244*e*. A circularly recessed fulcrum receiver 244*f* is formed on the rear of the fulcrum support 244*e*. The cylindrical fulcrum 251*e* is applied to the circular portion of the fulcrum receiver 244*f*. Consequently, the left side of the ETC cover 251 is supported and positioned by the projection 246*s* on the meter visor 204 side and by the fulcrum support 244*e*.

Figure 11:
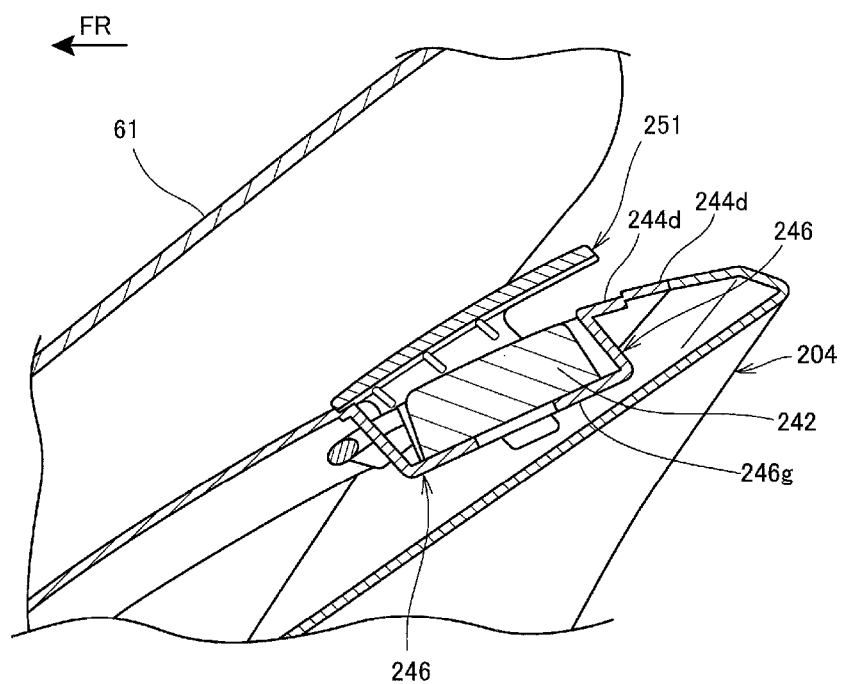
FIG. 11 is a cross-sectional view taken along line XI-XI of FIG. 6(A)
Figure 12:
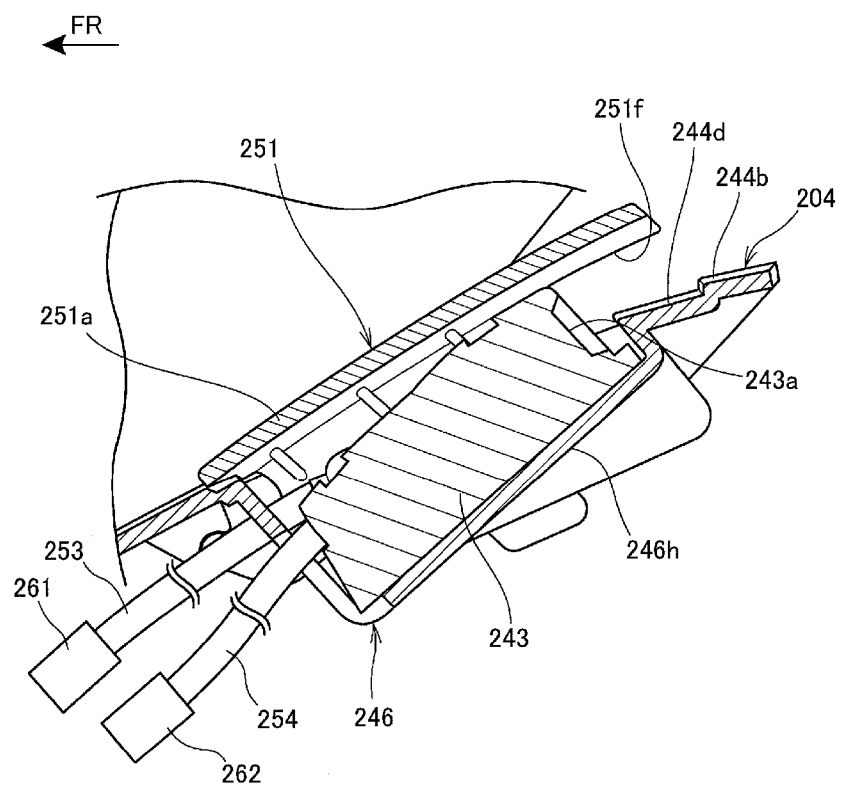
FIG. 12 is a cross-sectional view taken along line XII-XII of FIG. 6(A)

FIG. 11 is a cross-sectional view taken along line XI-XI of FIG. 6(A). FIG. 12 is a cross-sectional view taken along line XII-XII of FIG. 6(A).

As shown in FIG. 11, the antenna 242 has a substantially rectangular cross section. The antenna 242 is housed in the ETC compartment 246 without projecting upwardly from the upper surface 244*b* of the meter visor 204 and mounted on the antenna mount 246*g*.

As shown in FIG. 12, the indicator 243 is housed in the ETC compartment 246 so that the top of the indicator 243 projects increasingly upwardly in accordance with a decrease in the distance between the upper surface 244*b* of the meter visor 204 and the rear end of the indicator 243. Further, the indicator 243 is mounted on the indicator mount 246*h* with the upper front end of the indicator 243 brought close to or into contact with the lower surface 251*f* of the upper wall 251*a* of the ETC cover 251.

Connectors 261, 262, that are to be connected to connectors on the vehicle-mounted main body, are respectively attached to the leading end of the cable 253 for the antenna 242 and to the leading end of the cable 254 for the indicator 243.

Figure 13:
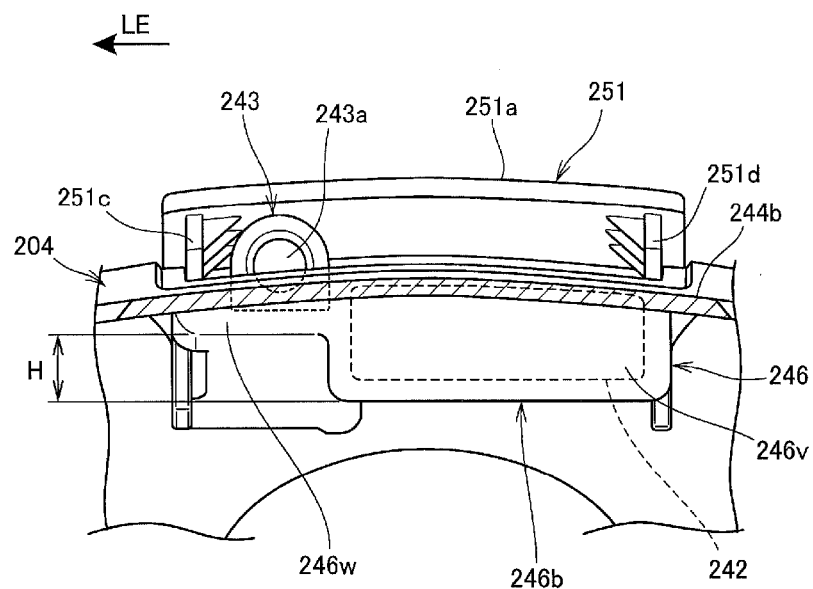
FIG. 13 is a cross-sectional view taken along line XIII-XIII of FIG. 6(A)

FIG. 13 is a cross-sectional view taken along line XIII-XIII of FIG. 6(A).

The antenna 242 is disposed under the upper surface 244*b* of the meter visor 204. The indicator 243 projects upwardly beyond the upper surface 244*b*. The display section 243*a* of the indicator 243 is circular in shape and glows or blinks green or red.

The upper surface 251*b* of the upper wall 251*a* of the ETC cover 251 has substantially the same curvature radius in the direction of the vehicle width as the upper surface 244*b* of the meter visor 204.

The rear wall 246*b* of the ETC compartment 246 includes a left rear wall 246*v* and a right rear wall 246*w* that are integral with each other. The lower edge of the left rear wall 246*v* is positioned higher than the lower edge of the right rear wall 246*w* by a height of H.

Figure 14:
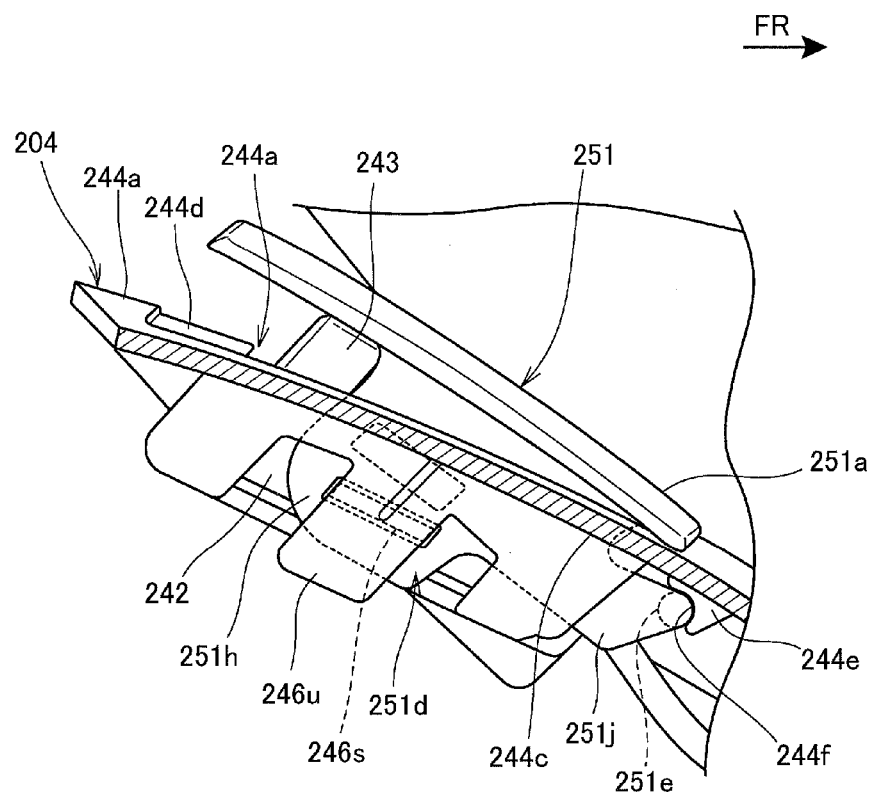
FIG. 14 is a cross-sectional view taken along line XIV-XIV of FIG. 6(A)

FIG. 14 is a cross-sectional view taken along line XIV-XIV of FIG. 6(A).

At the rear surface 244*c* and in the vicinity of the front edge of the opening 244*a*, the meter visor 204 is formed integrally with the pair of right and left fulcrum supports 244*e*, 244*e* (only the reference sign 244*e* on the near side is shown) that project downwardly. The front end of the sidewall 251*d* of the ETC cover 251, or more specifically, the cylindrical fulcrum 251*e* that projects inwardly in the direction of the vehicle width from the leading end of the sidewall 251*d*, is turnably applied to and supported by the right fulcrum support 244*e*. A circularly recessed fulcrum receiver 244*f* is formed on the rear of the fulcrum support 244*e*. The cylindrical fulcrum 251*e* is applied to the circular portion of the fulcrum receiver 244*f*. Consequently, the right side of the ETC cover 251 is supported and positioned by the projection 246*s* on the meter visor 204 side and by the fulcrum support 244*e*.

In other words, referring to FIGS. 1 and 14, the pair of right and left fulcrum supports 244*e*, 244*e* is formed on the meter visor 204 while the projection 246*s* is provided on both the left projection wall 246*r* and right projection wall 246*u* of the ETC compartment 246. Further, the fulcrum supports 244*e*, 244*e* and the right and left projections 246*s*, 246*s* support and position the right and left cylindrical fulcrums 251*e*, 251*e* and sidewalls 251*c*, 251*d* of the ETC cover 251.

Figure 15:
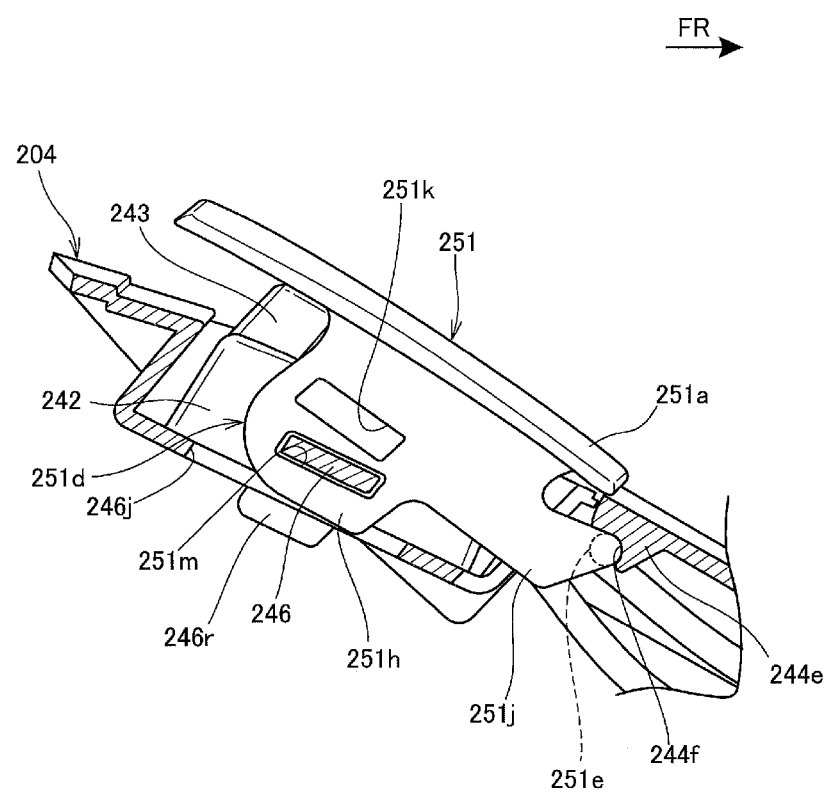
FIG. 15 is a cross-sectional view taken along line XV-XV of FIG. 6(A)

FIG. 15 is a cross-sectional view taken along line XV-XV of FIG. 6(A).

The sidewall 251*d* of the ETC cover 251 includes the rear bulge 251*h*, that bulges downwardly, and the front extension 251*j*, that is integral with the rear bulge 251*h* and extends forward from the rear bulge 251*h*. The rear bulge 251*h* is provided with the upper rectangular hole 251*k* and the lower rectangular hole 251*m*, that is positioned under the upper rectangular hole 251*k*. The lower rectangular hole 251*m* is engaged with the projection 246*s* that is formed integrally with the right projection wall 246*u* (see FIG. 14). The sidewall 251*c* (see FIG. 10) of the ETC cover 251 has the same shape as the sidewall 251*d*. The lower rectangular holes 251*m* of the sidewalls 251*c*, 251*d* are respectively engaged with the projections 246*s* of the left projection wall 246*r* and right projection wall 246*u* (see FIG. 14). The right and left lower rectangular holes 251*m*, 251*m* engage with the right and left projections 246*s*, 246*s* after being elastically deformed against the elastic forces of the left projection wall 246r, right projection wall 246u, and sidewalls 251c, 251d.

Figure 16:
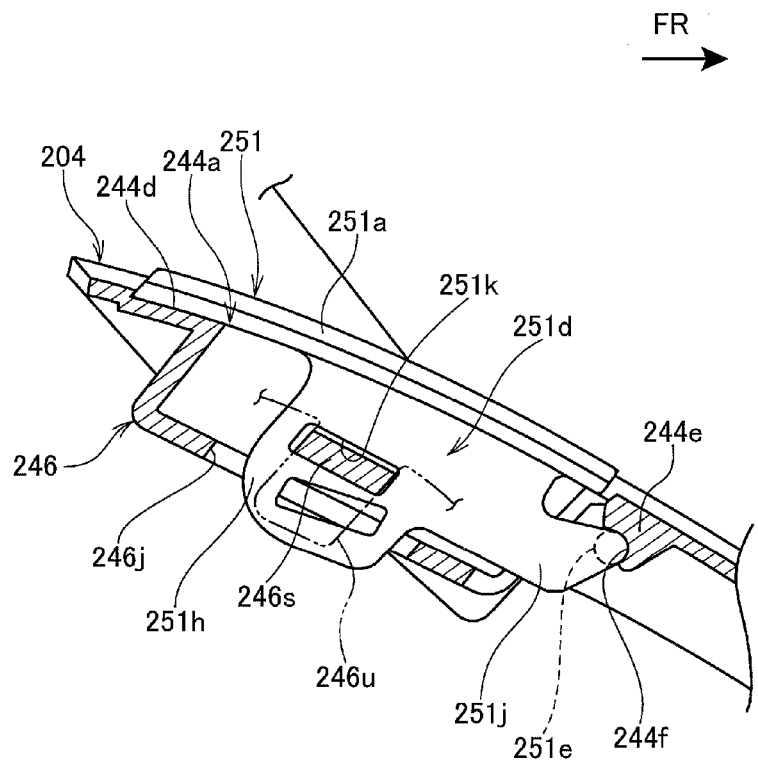
FIG. 16 is a cross-sectional view of the ETC cover that is closed and attached to the meter visor.

FIG. 16 is a cross-sectional view of the ETC cover 251 that is closed and attached to the meter visor 204.

As shown in FIG. 7, the front extensions 251j, 251j of the ETC cover 251 are inserted into the cover insertion holes 246p, 246q in the ETC compartment 246. Further, as shown in FIG. 16, the cylindrical fulcrums 251e, 251e (only the reference sign 251e on the near side is shown) disposed on the leading ends of the front extensions 251j, 251j (only the reference sign 251j on the near side is shown) are applied to the fulcrum receivers 244f, 244f (only the reference sign 244f on the near side is shown) on the meter visor 204 side. Furthermore, the upper rectangular holes 251k, 251k in the rear bulges 251h, 251h of the ETC cover 251 are engaged with the projections 246s respectively provided on the left projection wall 246r and right projection wall 246u of the ETC compartment 246. In this instance, the right and left upper rectangular holes 251k, 251k engage with the right and left projections 246s, 246s after being elastically deformed against the elastic forces of the left projection wall 246r, right projection wall 246u, and sidewalls 251c, 251d.

Consequently, the upper wall 251a of the ETC cover 251 is disposed on the stepped portion 244d of the opening 244a to close the opening 244a in the meter visor 204. Thus, the ETC compartment 246 is not exposed to the outside even when the ETC auxiliary machine is not mounted in its position. This provides improved appearance.

The upper rectangular holes 251k, 251k in the ETC cover 251 can be readily engaged with the projections 246s, 246s of the ETC compartment 246 when the ETC cover 251 is swung on the cylindrical fulcrums 251e, 251e while the cylindrical fulcrums 251e, 251e of the ETC cover 251 are applied to the fulcrum receivers 244f, 244f on the meter visor 204 side.

Further, the upper surface 251b of the upper wall 251a of the ETC cover 251 and the upper surface 244b of the meter visor 204 have substantially the same curvature radius in the direction of the vehicle length and in the direction of the vehicle width. This enhances the sense of unity between the meter visor 204 and the ETC cover 251, thereby providing improved appearance.

As shown in FIGS. 1, 2, 5, and 10, there is provided the auxiliary machine mounting structure of the motorcycle 1 as a saddle-ride type vehicle that includes the windshield 61, the meter visor 204, the seat 10, and the ETC auxiliary machine 241. The windshield 61 is disposed at the front of the vehicle body and made of a transparent member. The meter visor 204 is disposed in the lower rear of the windshield 61. The seat 10 on which an occupant is seated is disposed in the rear of the meter visor 204. The ECT auxiliary machine 241 is disposed on the windshield 61 side of the meter visor 204. The opening 244a is formed in the windshield 61 side of the meter visor 204. The ETC cover 251, which serves as a lid, is detachably mounted on the meter visor 204 to cover the opening 244a. The antenna 242 and the indicator 243, which form the ECT auxiliary machine 241, are positioned beneath the ETC cover 251 and disposed in the opening 244a.

According to the above-described configuration, the ETC cover 251 is detachably mounted on the meter visor 204. This makes it possible not only to lay the ETC cover 251 over the opening 244a in the meter visor 204 without regard to the presence of the antenna 242 and indicator 243, thereby providing improved appearance, but also to prevent the antenna 242 and indicator 243 from being exposed toward the windshield 61 by the ETC cover 251, thereby inhibiting the windshield 61 from creating a ghost image of the antenna 242 and indicator 243. This results in an increase in the degree of freedom in the layout of the antenna 242 and indicator 243.

As shown in FIGS. 6(A) and 13, the indicator 243 includes the display section 243a to indicate the status of the indicator 243 to the occupant and covers the top of the display section 243a with the ETC cover 251. This makes it possible to reduce the influence of external illuminance and enhance the visibility of the display section 243a.

As shown in FIG. 6(B), the ETC compartment 246, which is integral with the meter visor 204 and serves as an inner wall portion, is formed in the opening 244a with the antenna 242 and indicator 243 fastened to the ETC compartment 246. This eliminates the necessity of increasing the support strength of the ETC cover 251 and provides weight reduction.

As shown in FIGS. 6(B), 7, 10, and 14, the sidewalls 251c, 251d are formed on the right and left ends of the ETC cover 251. Further, the upper rectangular hole 251k and the lower rectangular hole 251m are disposed on the sidewalls 251c, 251d, as a plurality of lock portions, the right and left projections 246s, 246s as lock target portions are disposed on the ETC compartment 246, and the upper rectangular hole 251, the lower rectangular hole 251m and the projections 246s are selectively engage with each other in order to selectively change the mounting status of the ETC cover 251. This makes it possible to change the mounting status of the ETC cover 251 by using a simple structure. Consequently, the weight of the ETC cover 251 can be reduced.

As shown in FIGS. 6(B), 9, and 12, the plurality of auxiliary machines, namely, the antenna 242 and the indicator 243, are disposed in the opening 244a. Further, the antenna 242 and the indicator 243, which are electric components to which electrical power and signals are transmitted through the cables 253, 254, are connected to the connectors 261, 262 through the cables 253, 254. Furthermore, the connector insertion holes 246j, 246m, that serve as connector passage spaces for allowing the connectors 261, 262 to pass through the inside and outside of the meter visor 204, are respectively provided on the bottom wall 246e, that forms the ETC compartment 246, and on the front wall 246a, that serves as a sidewall. Therefore, the connector insertion holes 246j, 246m can be enlarged wherever possible. This makes it possible to readily dispose the connectors 261, 262 in their positions, thereby providing improved working efficiency. In addition, as the connector insertion holes 246j, 246m are provided, the bottom wall 246e and the sidewall 246a can be lightened for weight reduction purposes.

As shown in FIGS. 10 and 14, the ETC cover 251 is disposed in an open state so that its rear portion is open in relation to the opening 244a. Further, the front portion of the ETC cover 251 is provided with the cylindrical fulcrums 251e that serve as a journal point around which the ETC cover 251 turns. Therefore, the right and left lower rectangular holes 251m, 251m and the right and left cylindrical fulcrums 251e, 251e can position the ETC cover 251 in the open state by using a simple structure. This provides increased productivity of the meter visor 204 and of the ETC cover 251.

As shown in FIGS. 6(B) and 12, the length of the indicator 243 is oriented in the front-rear direction of the vehicle body with the display section 243a disposed on the rear of the indicator 243. This increases the visibility of the display section 243a for the rider.

Figure 17A:
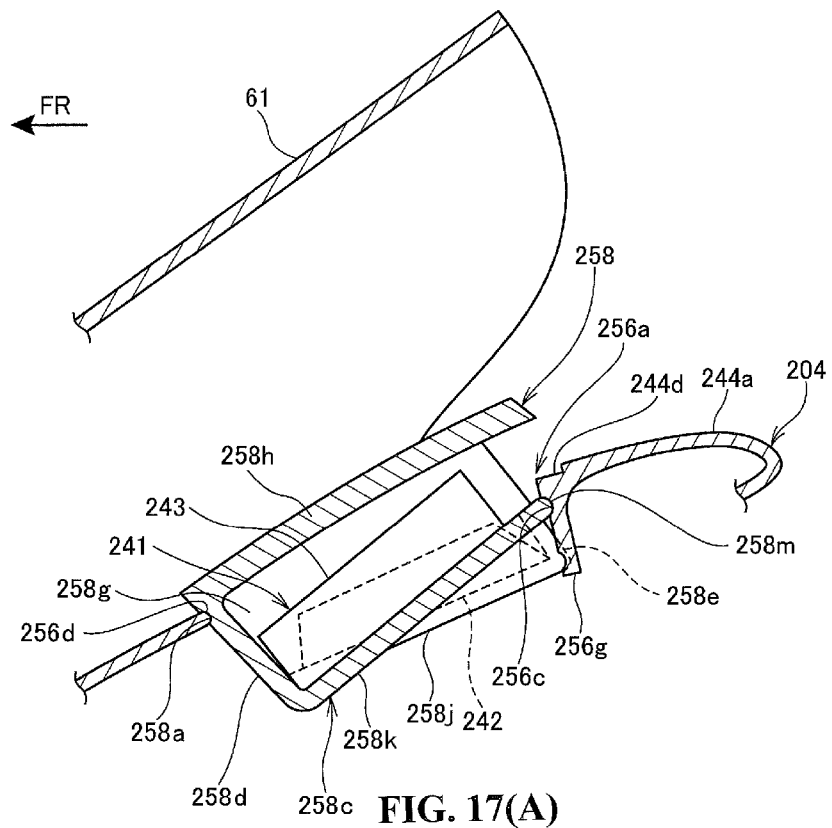
FIGS. 17(A) and 17(B) are cross-sectional views illustrating a second embodiment of an ETC auxiliary machine mounting structure.
Figure 17B:
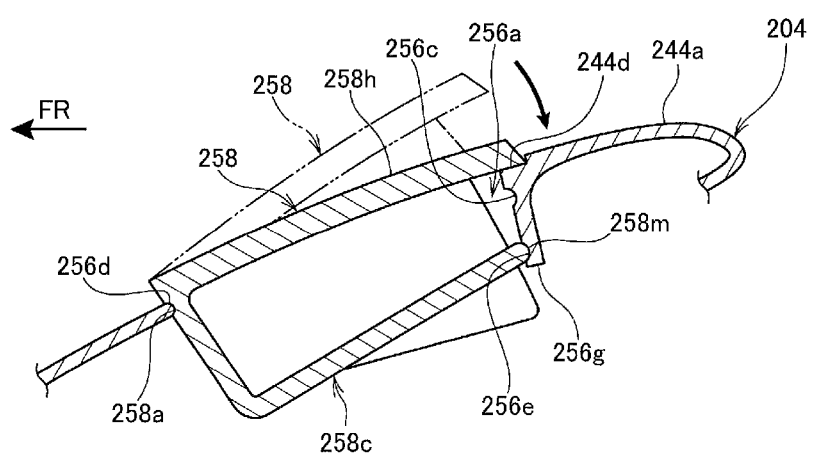

FIGS. 17(A) and 17(B) are cross-sectional views illustrating a second embodiment of the mounting structure of the ETC auxiliary machine 241. FIG. 17(A) is a cross-sectional view illustrating the ETC auxiliary machine 241 housed in an ETC compartment body 258, and FIG. 17(B) is a cross-sectional view illustrating a state where the ETC auxiliary machine 241 is not housed in the ETC compartment body 258.

As shown in FIG. 17(A), an opening 256a is formed in the upper rear of the meter visor 204. The ETC compartment body 258 is mounted on the meter visor 204 when the ETC compartment body 258, which houses the ETC auxiliary machine 241, is fitted into the opening 256a.

The ETC compartment body 258 includes a bottom wall 258c, a front wall 258d, a rear wall 258e, a left wall (not shown), a right wall 258g, and an upper wall 258h. The antenna 242 and the indicator 243 are placed on the bottom wall 258c. The front wall 258d, the rear wall 258e, the left wall, and the right wall 258g are erected on the bottom wall 258c. The upper wall 258h serves as a lid that joins the front wall 258d, the rear wall 258e, the left wall, and the right wall 258g.

A front groove 258a formed in the front wall 258d of the ETC compartment body 258 is engaged with a front support 256d that has a semicircular cross section and is disposed on the front edge of the opening 256a. A rear projection 258m formed on the rear wall 258e of the ETC compartment body 258 is engaged with an upper recessed portion 256c formed on a rear edge wall 256g of the opening 256a.

The bottom wall 258c includes a planar antenna mount 258j on which the antenna 242 is mounted, and a planar indicator mount 258k on which the indicator 243 is mounted. The indicator mount 258k is more steeply sloped than the antenna mount 258j and extends in an upward, rearward direction.

The gap between the upper edge of the rear wall 258e and the rear end of the upper wall 258h is open so that the display section disposed on the rear of the indicator 243 is visible to the rider. The upper wall 258h is laid over the ETC auxiliary machine 241 to prevent it from being exposed to the outside.

As described above, the ETC compartment body 258 is disposed integrally with the upper wall 258h, which is laid over the ETC auxiliary machine 241. This decreases the number of parts, thereby providing a cost reduction.

If the ETC auxiliary machine 241 is not to be housed in the ETC compartment body 258, the ETC compartment body 258 is swung downwardly as indicated by the arrow while the front groove 258a in the ETC compartment body 258 is engaged with the front support 256d of the opening 256a as shown in FIG. 17(B), and the rear projection 258m of the ETC compartment body 258 is engaged with a lower recessed portion 256e formed in the rear edge wall 256g while the rear edge wall 256g of the opening 256a is elastically deformed.

As a result of the above, the opening 256a in the meter visor 204 is covered by the upper wall 258h of the ETC compartment body 258. This provides improved appearance.

The above-described embodiments represent particular aspects of the present invention. Various modifications and applications can be arbitrarily made without departing from the spirit and scope of the present invention.

For example, in the first embodiment, it is assumed that the ETC compartment 246 is formed integrally with the meter visor 204 as shown in FIG. 7. However, an alternative is to form the ETC compartment 246 separately from the meter visor 204 and mount the ETC compartment 246 on the meter visor 204. Further, the position change structure for the ETC compartment body 258 according to the second embodiment shown in FIG. 17 is configured so that two different opening/closing positions can be selected depending on whether or not the ETC auxiliary machine 241 is housed in the ETC compartment body 258. Alternatively, however, the employed position change structure may be the same as a position change structure that works when the sidewalls 251c, 251d of the ETC cover 251 according to the first embodiment, which is shown in FIG. 7, engage with the left projection wall 246r and right projection wall 246u of the ETC compartment 246.

Furthermore, the present invention is applicable not only to the ETC auxiliary machine but also to the other auxiliary machines disposed on the meter visor such as a communication antenna and a tachometer and other indicators.

Moreover, the present invention is not only applicable to the motorcycle 1 but also to other saddle-ride type vehicles also including vehicles other than the motorcycles. The saddle-ride type vehicles include all vehicles ridden by straddling a vehicle body, or more specifically, include not only motorcycles (motorized bicycles also included) but also three-wheeled vehicles and four-wheeled vehicles classified as ATVs (all-terrain vehicles).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An auxiliary machine mounting structure of a saddle-ride vehicle, comprising:
a windshield disposed at a front of a vehicle body, said windshield being constructed of a transparent member;
a meter visor disposed in a lower rear of the windshield, the meter visor having a top surface with an opening, the top surface of the meter visor facing the windshield;
a seat on which an occupant is seated is disposed to a rear of the meter visor;
a lid detachably mounted on the top surface of the meter visor to cover the opening; and
auxiliary machines positioned beneath the lid and disposed in a compartment in the opening,
wherein the auxiliary machines include an indicator with a display section to indicate the status of the auxiliary machines to the occupant and covers the top of the display section with the lid,
wherein a gap is formed between an upper surface of the meter visor and a rear end of the lid,
wherein an indicator mount in the compartment is sloped at an inclination angle that is larger than an inclination angle of an antenna mount by an angle θ, and
wherein the indicator is disposed at a slope along the indicator mount.

2. The auxiliary machine mounting structure of a saddle-ride vehicle according to claim 1, wherein the compartment is an inner wall portion integral with the meter visor and is formed in the opening with the auxiliary machines fastened to the inner wall portion.

3. The auxiliary machine mounting structure of a saddle-ride vehicle according to claim 2, wherein sidewalls are formed on right and left ends of the lid; a plurality of lock portions are disposed on the sidewalls; wherein a lock target portion is disposed on the inner wall portion; and the lock portions and the lock target portion are selectively engage with each other in order to selectively change the mounting status of the lid.

4. The auxiliary machine mounting structure of a saddle-ride vehicle according to claim 2, wherein the auxiliary machines, which are electric components to which electrical power and signals are transmitted through cables, are connected to connectors through the cables; and connector passage spaces for allowing the connectors to pass through the meter visor are respectively provided on a bottom wall and a sidewall, which form the inner wall portion.

5. The auxiliary machine mounting structure of a saddle-ride vehicle according to claim 3, wherein the auxiliary machines, which are electric components to which electrical power and signals are transmitted through cables, are connected to connectors through the cables; and connector passage spaces for allowing the connectors to pass through the meter visor are respectively provided on a bottom wall and a sidewall, which form the inner wall portion.

6. The auxiliary machine mounting structure of a saddle-ride vehicle according to claim 3, wherein the lid is disposed in an open state so that the rear portion thereof is open in relation to the opening; and the front portion of the lid is provided with a journal point around which the lid turns.

7. The auxiliary machine mounting structure of a saddle-ride vehicle according to claim 1, wherein the length of the auxiliary machine is oriented in the front-rear direction of the vehicle body with the display section disposed on the rear of the auxiliary machine.

8. An auxiliary device mounting structure of a saddle-ride vehicle, comprising:
a windshield disposed at a front of a vehicle body, said windshield being constructed of a transparent member;
a meter visor operatively positioned to a rear side of the windshield, the meter visor having a top surface with an opening, the top surface of the meter visor facing the windshield;
a lid detachably mounted on the top surface of meter visor to cover the opening; and
an auxiliary device positioned beneath the lid and disposed in the opening.

9. The auxiliary device mounting structure of a saddle-ride vehicle according to claim 8, wherein the auxiliary device includes a display section to indicate the status of the auxiliary device to the occupant and covers the top of the display section with the lid.

10. The auxiliary device mounting structure of a saddle-ride vehicle according to claim 8, wherein an inner wall portion integral with the meter visor is formed in the opening with the auxiliary device fastened to the inner wall portion.

11. The auxiliary device mounting structure of a saddle-ride vehicle according to claim 9, wherein an inner wall portion integral with the meter visor is formed in the opening with the auxiliary device fastened to the inner wall portion.

12. The auxiliary device mounting structure of a saddle-ride vehicle according to claim 10, wherein sidewalls are formed on right and left ends of the lid; a plurality of lock portions are disposed on the sidewalls; wherein a lock target portion is disposed on the inner wall portion; and the lock portions and the lock target portion are selectively engage with each other in order to selectively change the mounting status of the lid.

13. The auxiliary device mounting structure of a saddle-ride vehicle according to claim 10, wherein the auxiliary device includes electric components to which electrical power and signals are transmitted through cables, and which are connected to connectors through the cables; and connector passage spaces for allowing the connectors to pass through the meter visor are respectively provided on a bottom wall and a sidewall, which form the inner wall portion.

14. The auxiliary device mounting structure of a saddle-ride vehicle according to claim 11, wherein the auxiliary device includes electric components to which electrical power and signals are transmitted through cables, and which are connected to connectors through the cables; and connector passage spaces for allowing the connectors to pass through the meter visor are respectively provided on a bottom wall and a sidewall, which form the inner wall portion.

15. The auxiliary device mounting structure of a saddle-ride vehicle according to claim 12, wherein the auxiliary device includes electric components to which electrical power and signals are transmitted through cables, and which are connected to connectors through the cables; and connector passage spaces for allowing the connectors to pass through the meter visor are respectively provided on a bottom wall and a sidewall, which form the inner wall portion.

16. The auxiliary device mounting structure of a saddle-ride vehicle according to claim 12, wherein the lid is disposed in an open state so that the rear portion thereof is open in relation to the opening; and the front portion of the lid is provided with a journal point around which the lid turns.

17. The auxiliary device mounting structure of a saddle-ride vehicle according to claim 9, wherein the length of the auxiliary device is oriented in the front-rear direction of the vehicle body with the display section disposed on the rear of the auxiliary device.

* * * * *